United States Patent [19]
Wittenbrink et al.

[11] Patent Number: 5,660,714
[45] Date of Patent: Aug. 26, 1997

[54] HYDROCONVERSION PROCESS UTILIZING A SUPPORTED NI-CU HYDROCONVERSION CATALYST

[75] Inventors: Robert Jay Wittenbrink; Stephen Mark Davis; Kenneth Lloyd Riley, all of Baton Rouge, La.

[73] Assignee: Exxon Research and Engineering Company, Florham Park, N.J.

[21] Appl. No.: 670,074

[22] Filed: Jun. 25, 1996

Related U.S. Application Data

[62] Division of Ser. No. 502,338, Jul. 14, 1995.

[51] Int. Cl.$^6$ ....................................................... C07C 5/13
[52] U.S. Cl. ........................ 208/79; 208/80; 208/137; 208/211; 585/737; 585/750; 585/302; 585/304
[58] Field of Search ........................... 585/737, 750, 585/302, 304; 208/79, 80, 137, 211

[56] References Cited

U.S. PATENT DOCUMENTS

| | | | |
|---|---|---|---|
| 2,678,263 | 5/1954 | Glazier | 44/80 |
| 4,044,064 | 8/1977 | Milstein et al. | 260/676 R |
| 4,886,935 | 12/1989 | Kokayeff et al. | 585/737 |

*Primary Examiner*—Shrive Beck
*Assistant Examiner*—Timothy Meeks
*Attorney, Agent, or Firm*—Jay Simon

[57] ABSTRACT

Nickel-copper catalysts supported on an acidic carrier, preferably containing a binder, are used to hydroisomerize paraffins, particularly Fischer-Tropsch paraffins, boiling at 350° F.+ into lighter, more valuable products.

2 Claims, 1 Drawing Sheet

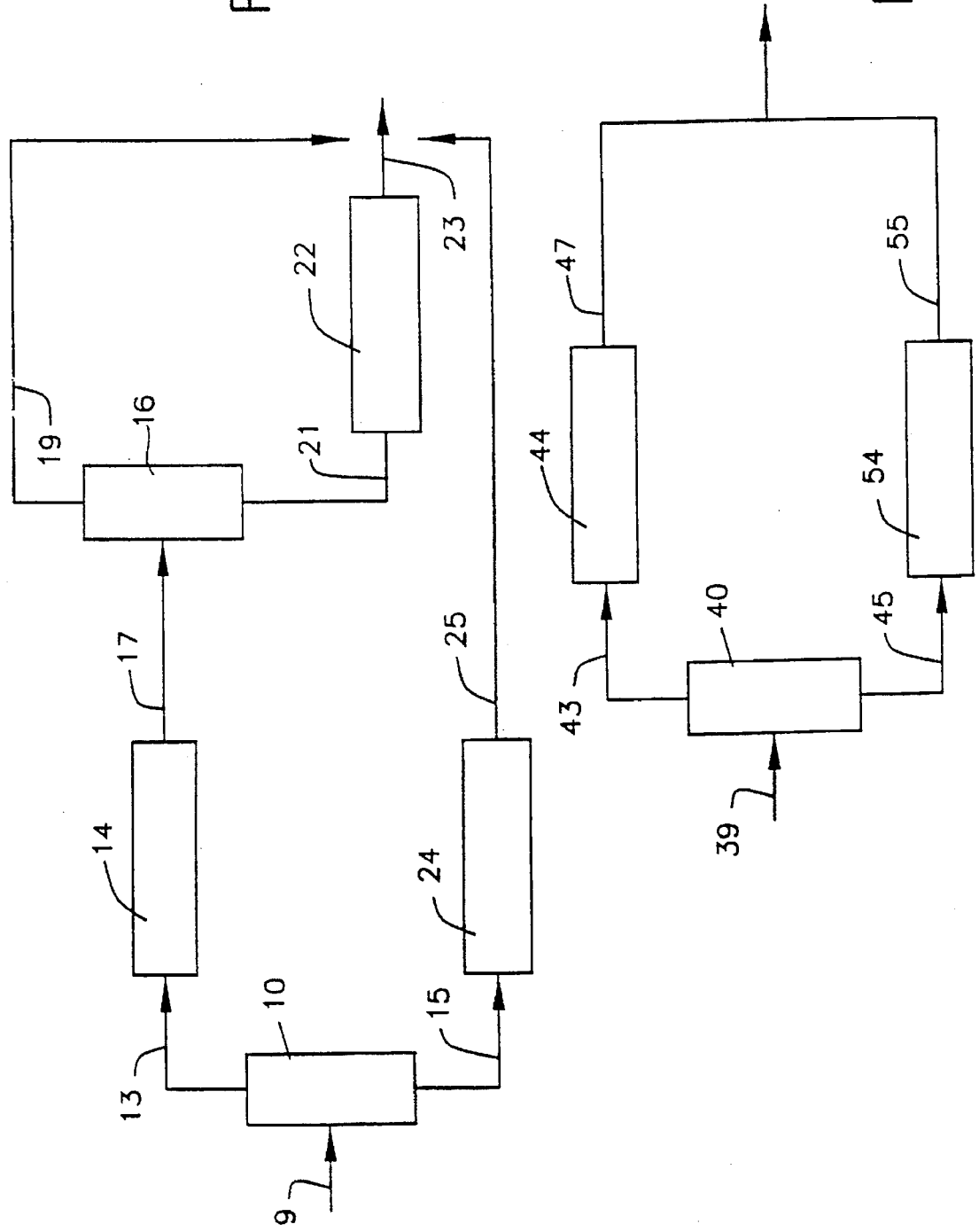

HYDROCONVERSION PROCESS UTILIZING A SUPPORTED NI-CU HYDROCONVERSION CATALYST

CROSS REFERENCE TO RELATED APPLICATIONS

This is a division of application Ser. No. 502,338, filed Jul. 14, 1995.

FIELD OF THE INVENTION

This invention relates to nickel containing hydroconversion catalysts. More particularly, this invention relates to a bimetallic catalyst wherein the hydrogenolysis activity of a nickel containing catalyst is reduced. Still more particularly, this invention relates to a bimetallic, supposed nickel containing catalyst useful in the hydroconversion of hydrocarbon containing feedstocks, particularly waxy products obtained from Fischer-Tropsch hydrocarbon synthesis processes.

1. Background of the Invention

The use of supported Group VIII metals in hydroconversion processes is well known. Often, these metals are combined with Group VIA metals, e.g., cobalt and molybdenum, on suitable supports for use in hydroconversion processes. Group VIII noble metals, e.g., platinum and palladium, are efficient hydroconversion catalysts, but these metals are also relatively expensive. Consequently, there exists a desire to find non-noble metals or combination thereof that can provide activity, selectivity, and activity maintenance equivalent to that of noble metals, thereby reducing significantly catalyst costs.

2. Summary of the Invention

In accordance with this invention, a new bi-functional catalyst for the hydroconversion of hydrocarbons, particularly waxy hydrocarbons from Fischer-Tropsch hydrocarbon synthesis processes, is provided and comprises a non-noble Group VIII metal in conjunction with a Group IB metal supported on a particular acidic component.

The presence of the Group IB metal is believed to mitigate the excessive hydrogenolysis and cracking activity of Group VIII metals, e.g., nickel, which produce excessive amounts of undesirable naphtha and $C_4-$ gases. Thus, the bifunctionality of hydrogenation and isomerization is maximized while hydrogenolysis and cracking activity is minimized. The preferred metals are nickel and copper.

The acidic support is preferably an amorphous silica-alumina where the alumina is present in amounts of less than about 30 wt %, preferably 5–30 wt %, more preferably 10–20 wt %. Additionally, the silica-alumina support may contain amounts of a binder for maintaining catalyst integrity during high temperature, high pressure processes. Typical binders include silica, alumina, Group IVA metal oxides, e.g., zirconia, titania, various types of clays, magnesia, etc., and mixtures of the foregoing, preferably alumina, silica, or zirconia, most preferably alumina. Binders, when present in the catalyst composition, make up about 5–50% by weight of the support, preferably 5–35% by weight, more preferably 20–30% by weight.

DESCRIPTION OF THE DRAWINGS

FIG. 1 is a schematic for the processing of Fischer-Tropsch waxes using a supported cobalt-molybdenum catalyst in accordance with U.S. Pat. No. 5,378,348.

FIG. 2 is a schematic for the simplified processing of Fischer-Tropsch waxes using the catalyst of this invention.

DESCRIPTION OF PREFERRED EMBODIMENTS

Characteristics of the support preferably include surface areas of 200–500 $m^2/gm$ (BET method), preferably about 250–400 $m^2/gm$; and pore volume of less than 1 ml/gm as determined by water adsorption, preferably in the range of about 0.35 to 0.8 m/gm, e.g., 0.57 ml/gm.

The preparation of conventional synthetic amorphous silica-alumina microspheres has been described in: Ryland, Lloyd B., Tamele, Microslav W., and J. Norton Wilson. "Cracking Catalysts." *Catalysis: Volume VII*. Ed. Paul H. Emmett. New York: Reinhold Publishing Corporation, 1960, pp. 5–9.

In order to use this material in a fixed bed reactor, it is mixed with a binder such as alumina or silica to form a wet paste and fed to a screw transport system and eventually emerges through dies constituting an end plate in an extruder. This end plate can have holes in the shape of circles, ovals, three-lobed joined rings, and four-lobed joined rings. A typical barrel auger type extruder is one manufactured by Welding Engineers.

The metals may be incorporated onto the support by any suitable method, and the incipient wetness technique is preferred. Suitable metal solutions may be used, such as nickel nitrate, copper nitrate or other aqueous soluble salts. Preferably, the metals are co-impregnated onto the support allowing for intimate contact between the Group VIII metal and the Group IB metal, for example, the formation of bimetallic clusters. The impregnated support is then dried, e.g., over night at about 100°–150° C., followed by calcination in air at temperatures ranging from about 200°–550° C., preferably 350°–550° C., so that there is no excessive loss of surface area or pore volume.

Group VIII metal concentrations of less than about 15 wt % based on total weight of catalyst, preferably about 1–12 wt %, more preferably about 1–10 wt % can be employed. The Group IB metal is usually present in lesser amounts and may range from about a 1:2 to about a 1:20 ratio respecting the Group VIII metal.

More preferred catalyst characteristics are shown below:

| | |
|---|---|
| Ni, wt % | 2.5–3.5 |
| Cu, wt % | 0.25–0.35 |
| $Al_2O_3$—$SiO_2$ | 65–75 |
| $Al_2O_3$ (binder) | 25–35 |
| Surface Area, $m^2/g$ | 290–325 |
| Total Pore Volume (Hg), ml/g | 0.35–0.45 |
| Compacted Bulk Density, g/ml | 0.58–0.68 |
| Avg. Crush Strength | 3.0 min. |
| Loss on Ignition (1 hour @ 550° C.), % wt. | 3.0 max. |
| Abrasion loss @ 0.5 hr, wt % | 2.0 max. |
| Fines, wt % thru 20 mesh | 1.0 max. |

In a specific embodiment of this invention the use of the aforementioned hydroconversion catalyst allows for an improvement in the processing of Fischer-Tropsch waxy products. Thus, in U.S. Pat. No. 5,378,348, there is disclosed a process whereby the product of a hydrocarbon synthesis process is separated into lighter, 500° F.– and heavier, 500° F.+ streams for treatment, the heavier stream being subjected to hydroisomerization with a silica-alumina supported cobalt-molybdenum catalyst. The stream separation is necessitated by the fact that this catalyst does not affect waxy product boiling below about 500° F. When jet fuel products are desired, normal paraffins in the jet fuel range can significantly and deleteriously affect the freeze point specification. The separation of product into fractions boiling above and below about 500° F. and the separate treatment of these fractions adds significantly to the cost and complexity of upgrading Fischer-Tropsch hydrocarbons.

However, because of the activity of the catalysts described in this invention, 350° F.+ material can be hydroisomerized with these new catalysts. Consequently, the need to separate out the 350° F.+ hydrotreated fractions from the 500° F.− fraction is eliminated.

Turning for a moment to the drawings, FIG. 1 is a simplified schematic based on U.S. Pat. No. 5,378,348. In this scheme a waxy product, for example, a Fischer-Tropsch product in line 9 is sent to fractionator 10 wherein the product is separated into a lighter, 500° F.− fraction in line 13 and a heavier 500° F.+ fraction in line 15. The lighter fraction is subjected to hydrotreating in hydrotreater 14. The product of the hydrotreater in line 17, after flashing $C_5$− products is separated in fractionator 16 into a $C_5$–350° F. cut in line 19 and a 350° F.+ cut in line 21 which is then subjected to hydroisomerization in reactor 22.

The heavier 500° F.+ fraction in line 15 is subjected to hydroisomerization without any prior chemical or catalytic treatment, in reactor 24, the product being recovered in line 25. The products of lines 19, 23, and 25 may be combined in any way to produce jet fuels or other distillates as may be required.

The hydrotreating and hydroisomerization catalysts and conditions are fully described in U.S. Pat. No. 5,378,348 the disclosure of which is incorporated herein by reference.

FIG. 2 is a simplified schematic of the upgrading of a Fischer-Tropsch wax in accordance with this invention and using the catalysts of this invention. The waxy feed in line 39 is sent to fractionator 40 where the feed is separated into a lighter product, preferably the entire liquid product, $C_5$–350° F., or a $C_5$– 320° F.+ product, and a heavier product, 320° F.+, preferably 350° F.+, in lines 43 and 45, respectively. The lighter product is hydrotreated in hydrotreater 44, the product, after $C_5$ flashing, recovered in line 47. The heavier product in line 45 is treated by hydroisomerization in accordance with the catalysts of this invention, i.e., nickel-copper on an amorphous silica-alumina support, reactor 54, the product being recovered in line 55. The products in lines 47 and 55 may then be combined for jet fuels or other desired distillates. Clearly, the flow plan in FIG. 2 is less complex than that of FIG. 1 and a fractionator (16) and light fraction hydroisomerization unit (22) are eliminated.

Thus, the catalyst for hydrotreating, i.e., the removal of any hetero-atom compounds, the lighter fraction may be any suitable catalyst, therefor, and preferably contains a Group VIII noble or non-noble metal, or Group VI metals or a combination thereof, supported on refractory oxides or zeolites, e.g., alumina, silica, silica-alumina, preferably alumina. Hydrotreating conditions include temperatures of 350°–600° F., pressures of 100–3000 psig, and hydrogen consumption rates of 200–800 SCF/B.

Hydroisomerization is carded out at conventional conditions, and the feed is not limited to Fischer-Tropsch products. Thus, the feed can comprise any 320° F.+ or 350° F.+ fraction that can be upgraded in product value by hydroisomerization, e.g., any feed containing significant amounts of normal paraffins.

Hydroisomerization is a well known process and the conditions for carrying out the process may vary widely. Generally, however, some broad and preferred conditions are shown in the table below:

|  | Broad Range | Preferred Range |
|---|---|---|
| Temperature, °F. | 300–800 | 650–750 |
| Pressure, psig | 0–2500 | 500–1200 |
| Hydrogen Treat Rate, SCF/B | 500–5000 | 2000–4000 |
| Hydrogen Consumption Rate, SCF/B | 50–500 | 100–300 |

Preferred feeds to the hydroisomerization are those containing significant amounts of normal paraffins, e.g., greater than about 40% normal paraffins, and particularly normal paraffins obtained from Fischer-Tropsch processes, a typical product slate which may vary by ±10% for each fraction, from Fischer-Tropsch process liquids being

| IBP-320° F. | 13 wt % |
|---|---|
| 320–500° F. | 23 wt % |
| 500–700° F. | 19 wt % |
| 700–1050° F. | 34 wt % |
| 1050° F.+ | 11 wt % |

The Fischer-Tropsch process can produce a wide variety of materials depending on catalyst and process conditions. Currently, preferred catalysts include cobalt, ruthenium, and iron, most preferably cobalt. Cobalt and ruthenium make primarily paraffinic products, cobalt tending towards a heavier product slate, e.g., containing $C_{20}+$, while ruthenium tends towards more distillate-like paraffins, e.g., $C_5$–$C_{20}$.

The following examples will further serve to illustrate this invention are should not be considered as limiting the invention in any way.

EXAMPLE 1

Catalyst supports making catalysts with good activity, selectivity, and strength have been prepared using the following procedure:

1) Add 210 g of as-received C25-DS (97.4 wt % NVM) to a Kitchen Aid Blender and blend with 500 g deionized water.
2) Add 2000 g of a 4.5 wt % $Al_2O_3$ db reforming grade alumina sol to the blender and blend fog 10 minutes.
3) Make up a solution consisting of 133 g of concentrated ammonium hydroxide in 133 g deionized water.
4) Add the ammonium hydroxide solution to the contents in the blender. Note that gel-like material is formed. Stir for 10 minutes.
5) Pour the gel-like material into two large evaporation dishes and put into a forced air oven to dry over the weekend at 110° C.
6) Ball mill the dried material for 18 hours.
7) Add 407 g of the ball milled material to a Simpson Mix-Muller and mull into the powder 230 g of deionized water.
8) Extrude the mulled paste to 1.3 mm trilobes.
9) Air dry the green extrudates overnight in a hood with flowing air.
10) Put the extrudates in a forced air oven and dry at 110° C. for 3 hours.
11) Calcine in a Muffle furnace for 2 hours in air at 548° C. Inspections on the carrier are:

| | |
|---|---|
| Surface Area = | 313.0 m²/g |
| Pore Volume = | 0.37 ml/g |
| Compacted Bulk Density = | 0.62 g/ml |

EXAMPLE 2

A catalyst comprising 3 wt % Ni and 0.6 wt % Cu on a silica-alumina support having 12.5% by weight alumina and 30 wt % alumina binder was prepared in accordance with the procedure of Example 1. The surface area was 394 m²/gm and the pore volume was 0.57 ml/gm. The catalyst was crushed and sized to 14/35 mesh (Tyler). Hydroconversion experiments were carded out in a small upflow pilot plant.

1) A catalyst of this invention was made using a catalyst support prepared according to Example 1. 50 g of the extruded carrier was impregnated with a solution made by dissolving 7.659 g of Baker Nickel Nitrate (Lot #002186) and 0.572 g of Alfa Products Copper Nitrate (Lot #112184) into deionized water to a volume of 35.6 ml and impregnate the 50.0 g db of extruded carrier.
2) Impregnate the solution onto the extruded carrier.
3) Air dry overnight.
4) P&S oven dry for 4 hours.
5) Calcine for 2 hours at 427° C. in flowing air.

This catalyst had a surface area of 324m² /g and a pore volume of 0.41 ml/g.

The feed for each experiment was a 350° F.+ Fischer-Tropsch wax having the product distribution shown in Table 1 below. The feed was obtained by reacting hydrogen and CO over Fischer-Tropsch catalyst comprising cobalt and rhenium on a titania support.

Hydroisomerization reaction conditions were 750 psig, 2500 SCF/B hydrogen treat rate at 0.5–1.0 LHSV. The degree of 700° F.+ conversion was varied by adjusting reactor temperature. Product distribution for various catalysts (all using the same support) are shown in Table 1 and jet freeze for each catalyst is shown in Table 2.

The results in Table 1 clearly show that the catalyst of this invention (exp. 4) gave a reaction product very similar to the reaction product achieved with a noble metal catalyst (exp. 1). Also, the jet freeze quality, shown in Table 2 for the catalyst of this invention was virtually identical to that achieved with a noble metal catalyst and significantly better than that achieved with either a cobalt-molybdenum catalyst or a nickel catalyst.

TABLE 1

| Experiment | Feed | 1 | 2 | 3 | 4 |
|---|---|---|---|---|---|
| Catalyst Description | — | Pd/Support | Co/Mo/Support | Ni/Support | Ni/Cu/Support |
| Metal Content, wt % | — | 0.5 | Co 1.26, Mo 10.1 | 3 | Ni 3, Cu 0.6 |
| LHSV, v/v/hr | — | 1.0 | 0.5 | 1.0 | 1.0 |
| Reactor Temp., °F. | — | 640 | 620 | 640 | 630 |
| 700° F.+ Conversion | — | 32.6 | 42.8 | 99.3 | 32.3 |
| $C_1$–$C_4$ | 0 | 0.87 | 7.65 | 15.56 | 1.13 |

TABLE 1-continued

| Experiment | Feed | 1 | 2 | 3 | 4 |
|---|---|---|---|---|---|
| $C_5$–320° F. | 0 | 5.78 | 16.46 | 38.44 | 5.75 |
| 320–500° F. | 31.33 | 33.07 | 30.50 | 33.13 | 32.84 |
| 500–700° F. | 20.93 | 28.10 | 18.14 | 12.55 | 27.97 |
| 700° F.+ | 47.44 | 32.20 | 27.26 | 0.32 | 32.31 |

TABLE 2

| Catalyst | 1 | 2 | 3 | 4 |
|---|---|---|---|---|
| 320–500° F. (i/n, w/w) | 1.34 | 0.24 | 0.52 | 1.31 |
| Jet Freeze, °F. | −35.0 | −22.0 | −27.8 | −35.9 |

The catalyst of this invention, exp. 4, produced an isoparaffin/normal paraffin ratio virtually equivalent to that of a noble metal catalyst and much greater than that for the Co/Mo or Ni only catalysts (which had greater 700° F.+ conversion), thereby showing the excellent hydroisomerization activity and selectivity of the catalyst of this invention, along with very little hydrogenolysis activity, i.e., very low $C_1$–$C_4$ product.

What is claimed is:

1. A hydroconversion process comprising hydroisomerizing, at hydroisomerization conditions, a 350° F.+ hydrocarbon containing feed comprised at least in part of normal paraffins in the presence of hydrogen and a catalyst comprising nickel in an amount of less than about 15 wt % based on the total weight of the catalyst and copper in a copper:nickel ratio of less than 1:2 supported on an amorphous silica-alumina carrier having less than about 30 wt % alumina, the carrier having a surface area of greater than about 200 m² /gm and a pore volume of less than about 1.0 ml/gm.

2. A process for producing middle distillate transportation fuel components from a waxy product of a hydrocarbon synthesis process comprising:

(a) separating the waxy product and separately recovering a 350° F.− lighter fraction and a 350° F.+ heavier fraction;

(b) separately catalytically hydrotreating the lighter fraction and catalytically hydroisomerizing the heavier fraction, wherein the heavier fraction is hydroisomerized utilizing a catalyst comprising nickel in an amount of less than about 15 wt % based on the total weight of the catalyst and copper in a copper:nickel ratio of less than about 1:2 supported on an amorphous silica-alumina carrier having less than about 30 wt % alumina the carrier having a surface area of greater than about 200 m²/gm and a pore volume of less than about 1.0 ml/gm, thereby improving cold flow properties of the hydroisomerized products; and (c) combining at least a portion of the hydrotreated product of the lighter fraction with at least a portion of the hydroisomerized product of the heavier fraction.

* * * * *